United States Patent
Haag

[11] Patent Number: 6,095,237
[45] Date of Patent: Aug. 1, 2000

[54] ROLL ARRANGEMENT AND METHOD FOR COOLING A ROLL

[75] Inventor: Rolf van Haag, Kerken, Germany

[73] Assignee: Voith Sulzer Finishing GmbH, Krefeld, Germany

[21] Appl. No.: 09/028,099

[22] Filed: Feb. 23, 1998

[30] Foreign Application Priority Data

Feb. 27, 1997 [DE] Germany ............ 197 07 876

[51] Int. Cl.$^7$ ............................. F28D 11/02
[52] U.S. Cl. ................. 165/89; 165/86; 165/90; 492/46
[58] Field of Search .............. 165/89, 90, 86; 492/46

[56] References Cited

U.S. PATENT DOCUMENTS

| | | | |
|---|---|---|---|
| 1,839,057 | 12/1931 | Singrun | 165/90 |
| 2,547,086 | 4/1951 | Mcdermott | 165/89 |
| 3,619,539 | 11/1971 | Taylor | 165/104.25 |
| 3,753,463 | 8/1973 | Segelken et al. | 165/134.1 |
| 3,967,386 | 7/1976 | Asfura | 165/89 |
| 4,617,864 | 10/1986 | Niedermaier et al. | 165/90 |
| 4,683,627 | 8/1987 | Rienhold | 165/89 |
| 4,955,433 | 9/1990 | Zaoralek | 165/90 |
| 5,062,355 | 11/1991 | Greiwe | 165/89 |
| 5,111,564 | 5/1992 | Pav et al. | 165/89 |
| 5,370,177 | 12/1994 | Fey et al. | 165/89 |
| 5,426,495 | 6/1995 | Sawamura et al. | 165/89 |
| 5,537,756 | 7/1996 | Haessner et al. | 165/89 |
| 5,549,154 | 8/1996 | Niskanen | 165/89 |
| 5,571,066 | 11/1996 | Kayser | 492/46 |
| 5,655,596 | 8/1997 | Zaoralek | 165/89 |
| 5,725,466 | 3/1998 | Eppli et al. | 165/89 |
| 5,776,248 | 7/1998 | Spatafora | 165/89 |
| 5,778,971 | 7/1998 | Szam | 165/89 |

FOREIGN PATENT DOCUMENTS

| | | |
|---|---|---|
| 0292123 | 11/1988 | European Pat. Off. . |
| 0567875 | 11/1993 | European Pat. Off. . |
| 2400615 | 7/1975 | Germany ............ 165/89 |
| 225767 | 8/1985 | Germany . |
| 4410675 | 9/1995 | Germany . |
| 19513500 | 10/1996 | Germany . |

*Primary Examiner*—Ira S. Lazarus
*Assistant Examiner*—Terrell McKinnon
*Attorney, Agent, or Firm*—Greenblum & Bernstein, P.L.C.

[57] ABSTRACT

A roll arrangement that includes a roll with a hollow space arrangement and a heating device that acts on the exterior of the roll. A vaporizable fluid and a heat exchanger are positioned in the hollow space arrangement of the roll to cool the roll more rapidly after the heating device has been shut down and, thus, facilitate handling the roll. A method for cooling a roll for use in a machine for producing a fibrous material web. The roll has been heated on an exterior by an exterior heat source by and includes a hollow space that is at least partially filled with a vaporizable fluid. The roll is, moreover, coupled with a heat exchanger. The method includes vaporizing the vaporizable fluid in the hollow space, condensing the vapor on the heat exchanger by a coolant flow through the heat exchanger, and rotating the heat exchanger within the hollow space to fling the condensed liquid within the hollow space.

42 Claims, 1 Drawing Sheet

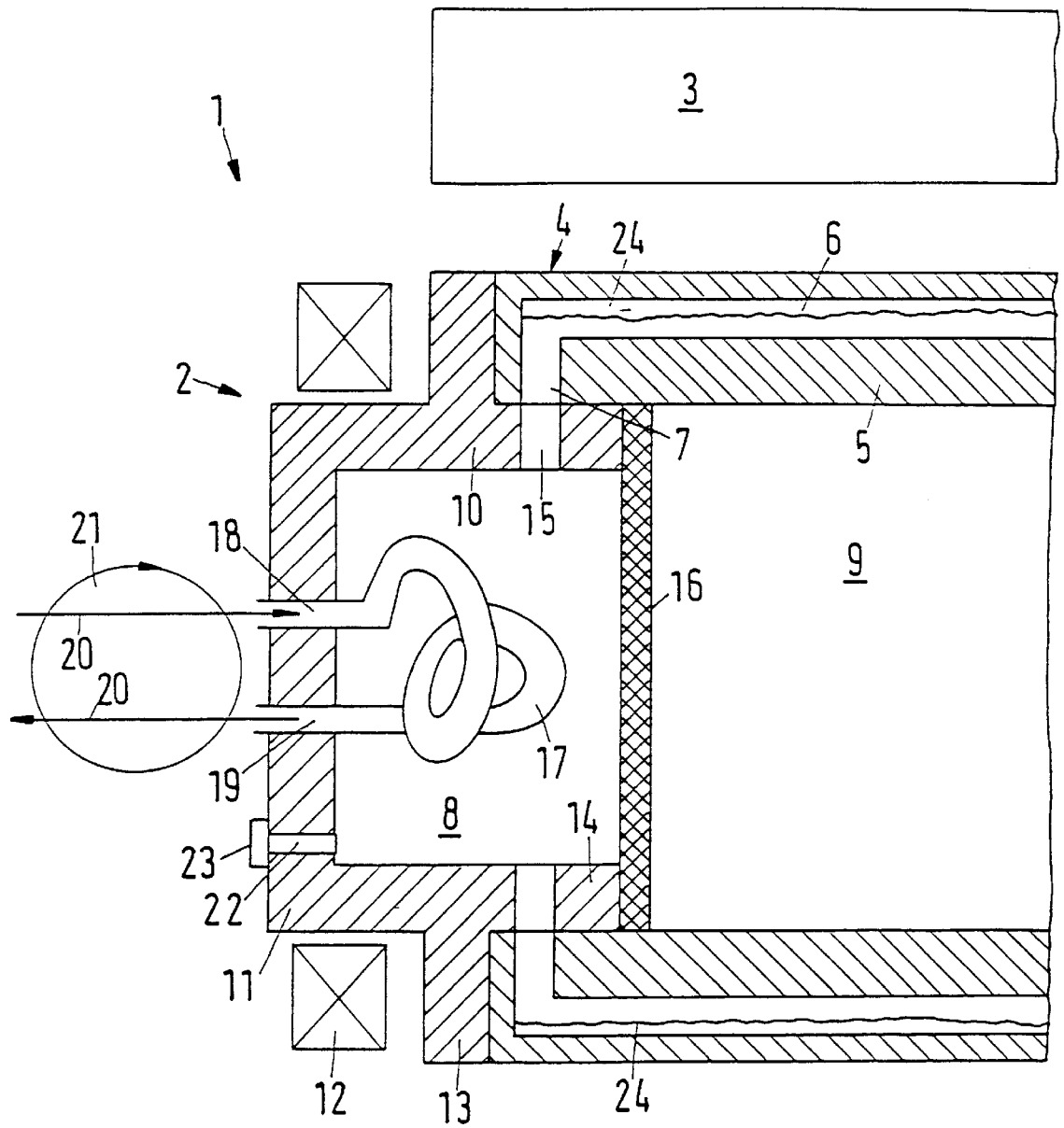

ROLL ARRANGEMENT AND METHOD FOR COOLING A ROLL

CROSS-REFERENCE TO RELATED APPLICATION

The present application claims priority under 35 U.S.C. § 119 of German Patent Application No. 197 07 876.1 filed Feb. 27, 1997, the disclosure of which is expressly incorporated by reference herein in its entirety.

BACKGROUND OF THE INVENTION

1. Field of the Invention

The present invention relates to a roll arrangement of a machine for producing paper and/or cardboard wherein a roll includes a hollow space arrangement and a heating device that acts on the roll from the exterior. The present invention further relates to a method for cooling a roll.

2. Discussion of Background Information

A roll arrangement that includes a hollow space arrangement and a heating device that acts on the outside of the roll is described in DE 44 10 675 A1.

Generally, roll arrangements that include a roll with a hollow space arrangement and a heating device acting on the exterior of the roll are used with other rolls to impart heat and pressure on a web, particularly a fibrous pulp web, to improve certain characteristics of the pulp. For example, where a paper pulp web is concerned, producing gloss and/or smoothness may be important or it may be important to compress the paper web.

The heating device creates higher temperatures on the surface of the roll, which then may act on the web. However, the heat that is supplied to the surface of the roll may also penetrate other areas of the roll, which then function like heat accumulators so to speak. After turning off the heating device, there is always a certain period of time one must wait before the roll is cool enough to be handled. It may, however, be necessary to handle the roll when, or example, the roll needs to be changed.

It is known to cool the rolls by equipping the rolls with attachments that include cooling water to flush the roll. The flushing removes the heat relatively quickly, but the cooling water causes a considerable increase in the weight of the roll so that the bearing must have greater dimensions. Further, one particular disadvantage with this system is the relatively great thermal stresses that are caused by the difference in temperature between the roll and the cooling water that flushes it. The varying heat stresses occur in an axial direction. The water flowing into the roll on one side has a lower temperature which increases as the water flows over the roll. The cost to control this thermal stress is relatively high.

SUMMARY OF THE INVENTION

The present invention simplifies the ability to handle a roll that is heated on the outside. The present invention includes a roll arrangement of the type mentioned at the outset, such that a vaporizable fluid and a heat exchanger are arranged in the hollow space arrangement and a method for cooling such a roll.

When the roll must be cooled, the heat from inside the roll is diverted with the aid of a heat exchanger. The heat is diverted by the vaporization of the fluid on the hot areas of the roll. The hot vapor expands uniformly over the hollow space arrangement and automatically reaches the heat exchanger, where it is cooled. The difference in temperature between the roll and the heat exchanger causes a correlating difference in pressure between the different positions inside the roll. The different pressures cause a continuous transport of the vapor of the fluid to the heat exchanger. This allows the heat to be removed from the roll relatively quickly and, thus, the roll can cool correspondingly quickly. Despite the relative quickness of cooling the roll, practically no consequential differences in temperature occur over the length of the roll or over the circumferential direction because the vaporizable fluid automatically creates a stabilizing or equilibrium effect. More fluid is vaporized in hotter areas of the roll, thus, more heat is emitted than in cooler areas of the roll. The result is a substantially uniform distribution of temperature during the cooling phase. In addition, this leveling or evening of the temperature can be used while the roll is in operation, even when the heat exchanger is not operating. For example, if the heating device heats the roll unevenly, the fluid will vaporize in the hotter areas and remove heat there. In the cooler areas of the roll, the vapor will condense or at least discharge heat. Thus, filling the hollow space of the roll with a vaporizable fluid will effectively allow the distribution of the temperature to be evened out during operation of the roll.

It is advantageous to have both the liquid phase and the gas phase of the fluid present in the hollow space arrangement during all operating states of the roll. Thus, the hollow space arrangement is never completely filled with fluid and also never completely filled with vapor. Because the operational conditions of the roll are generally known, one can measure the amount of the vaporizable fluid that must be used to maintain any projected temperature. "Operating states" means all those states to which the roll is exposed, including the resting state, or the state before operations are initiated, where the roll is subjected to and has likely assumed the temperature of the environment.

According to another aspect of the invention, the hollow space arrangement may include an evacuation extension. With the aid of an evacuation extension, a vacuum can be created in the hollow space arrangement, whereby the pressure in the vacuum is below atmospheric pressure. Because the vaporizing temperature of the fluid in the hollow space is also dependent upon the pressure, decreasing the pressure can cause the fluid to vaporize at even lower temperatures. Thus, with the aid of a heat exchanger, it is possible to cool the roll at atmospheric pressure to temperatures that are below the vaporizing temperature of the fluid. If, for example, water is used as the vaporizable fluid, it is possible to cool the roll using this procedure to temperatures below approximately 100° C., at, for example to about 70° C.

According to another aspect of the invention, it may also be advantageous to decrease the temperature of the heat exchanger below the condensation temperature of the fluid. Then, the fluid not only condenses around the heat exchanger, but also becomes further cooled, i.e., its temperature is lowered further. If this colder fluid reaches hotter areas of the roll, the fluid can absorb a correspondingly higher amount of heat. The heat must first be absorbed to heat the fluid to the fluid's evaporation temperature and then the heat is used to vaporize the fluid. Thus, the roll is more quickly cooled.

It may be further advantageous to have the heat exchanger rotate. The heat exchanger can, for example, rotate with the roll, although this is not essential. The heat exchanger, by rotating, spins the fluid that condenses around it radially outward due to the centrifugal force. By automatically transporting the cooler fluid to the outer walls of the roll (by spinning), additional heat may be dissipated and the roll may be cooled more quickly.

In some instances, it may further be advantageous to have the coolant supplied to the heat exchanger from an outside source by a rotating attachment. A coolant, such as water for example, can absorb greater amounts of heat and can also transport this heat relatively quickly to the exterior of the roll. It is easier to seal a rotating attachment for fluids than for gases, i.e., the fluid vapor. Thus, through the combination of these measures, a beneficial sealed system is attained which allows the heat to be removed with increased rapidity.

According to another aspect of the invention, the hollow space arrangement may include a hollow area that substantially fills the interior of the roll. The roll, thus, is substantially formed by a roll sleeve or a roll tube or jacket. Due to centrifugal forces, the fluid reaches the roll sleeve and forms a fluid film with a thickness of a few millimeters. An even distribution of temperature results in the roll tube or jacket based primarily on two principals. First, the fluid evaporates more in hotter places and condenses more in cooler places, and second, the vaporization and condensation temperatures are dependent upon the pressure in the hollow area. During the cooling of the roll, when heat is diverted to the exterior by the heat exchanger, the pressure also falls, causing the condensation or the evaporation temperature to fall. However, the uniformity of temperature throughout the roll is not adversely affected.

The hollow space may further include a multitude of peripheral bore holes which are circumferentially distributed and which run in the axial direction, parallel to the axis of the roll. If the hollow space completely fills the inside of the roll, the roll may (disadvantageously) bulge at higher temperatures due to the resulting high vapor pressures in the interior of the roll. However, if one is able to direct the fluid, with its liquid and gas phase, through the peripheral bore holes, this disadvantageous bulging does not arise. Thus, an even temperature distribution and a faster heat removal can be maintained without causing great thermal stresses.

According to another aspect of the invention, it may be advantageous to have the heat exchanger be arranged in the hollow space, with the peripheral bore holes connecting to the hollow space, thus combining the hollow space with the peripheral bore holes. Connecting the peripheral bore holes and the hollow space allows the heat to be transported from the roll to the heat exchanger easily and reliably.

Further, it may be particularly useful if the hollow space extends somewhat in the axial direction (i.e., along the axis of the roll). If one limits the extension of the hollow space in the axial direction, then one also defines the area in which the pressure inside the pressures are more easily manageable because the "holding forces," which counteract the interior pressures, are at work over the faces of the roll. In particular, when using the peripheral bore holes, the desired stability of the roll can be attained, even at higher temperatures.

It may further be advantageous for the roll to include a pin or pivot unit and to have the heat exchanger positioned within the pin unit. The pin unit includes a pin that pivotally positions the roll. This is particularly advantageous when manufacturing the roll because the pin unit can be completely assembled before installing it in the roll tube. Thus, both the heat exchanger and the positioning capability for the roll are installed in one unit.

It may be particularly useful for the pin unit to project far enough into the roll tube to cover the openings of the peripheral bore holes so that the hollow space in the pin unit is formed in the axial direction and the hollow space is sealed off from the inside of the roll tube or jacket. This eliminates the hollow space in the axial direction so that an increase in pressure in the hollow space cannot lead to the bulging of the roll. On the other hand, the hollow space remains connected to the peripheral bore holes in the roll tube. Sealing the pin unit from the roll tube is relatively easy to accomplish.

Another way of stating the invention is a roll arrangement for use in a machine for producing a fibrous material web that includes a roll having an axis and two axial ends. The roll further includes a hollow space arrangement on the interior of the roll. The roll arrangement further includes a heating device that acts on the exterior of the roll and a heat exchanger that may be positioned in the hollow space arrangement. Further, vaporizable fluid, having a liquid phase and a gas phase is also positioned in the hollow space arrangement.

The fibrous material web may be either a paper web or a cardboard web.

According to one aspect of the invention, the liquid phase and the gas phase of the fluid are present during substantially all operational stages of the roll.

It is, moreover, possible for the hollow space arrangement to include an evacuation extension for reducing the pressure on the interior of the roll.

Further, the heat exchanger may have a temperature below that of the condensation temperature of the fluid.

According to another aspect of the invention, the heat exchanger may be rotatable and may further be adapted to receive coolant from a rotating extension positioned on the exterior of the wall.

It is possible for the hollow space arrangement to include a hollow space that substantially fills the interior of the roll and to include a multitude of peripheral bore holes. The peripheral bore holes may be circumferentially distributed and may extend substantially parallel to the axis of the roll.

It is possible, moreover, for the heat exchanger to be positioned within the hollow space and for the peripheral bore holes to be connected to the hollow space.

According to yet another aspect of the invention, the hollow space may extend within the roll in an axial direction.

The roll may also include a pin unit that includes a pin to rotationally position the roll. Moreover, the heat exchanger may be positioned in the pin unit and the roll may include a roll tube on the interior of the roll.

According to one aspect of the invention, the pivot unit projects into the roll tube and overlaps the peripheral bore holes. The hollow space is positioned in the pin unit is sealed, in the axial direction, from the interior of the roll tube.

Another way to state the invention is a roll arrangement for use in a machine for producing a fibrous material web that includes a roll that has an axis and two axial faces and that includes a hollow space positioned inside the roll. The hollow space is substantially impermeable to gas and liquid. The roll arrangement further includes a heating device that heats the circumferential surface of the roll and a heat exchanger that is arranged in the hollow space. A vaporizable fluid is positioned in the hollow space.

The fibrous material web may be either a paper web or a cardboard web.

According to one aspect of the invention, the vaporizable fluid exists in a liquid phase and a gas phase in the hollow space during substantially all operational stages of the roll.

Further, the roll may further include an evacuation extension positioned in the hollow space and extending outside the roll. The evacuation extension is adapted to lower the pressure inside the hollow space.

According to another aspect of the invention, the heat exchanger may have a temperature lower than the condensation temperature of the vaporizable fluid.

Further, the heat exchanger may be adapted to rotate inside the hollow space and may further be coupled with a coolant supply.

According to another aspect of the invention, the hollow space may substantially fill the interior of the roll and may further include a multitude of peripheral bore holes. The peripheral bore holes may be circumferentially distributed and extend substantially parallel to the axis of the roll.

According to yet another aspect of the invention, the heat exchanger and the peripheral bore holes may be connected to the hollow space. Further, the hollow space may extend somewhat towards the two axial faces.

According to still another aspect of the invention, the roll may include a pin unit that includes a pin to rotationally position the roll. The heat exchanger may be sited in the pin unit.

Further, the roll may include a roll tube that includes an interior. The hollow space may be, moreover, arranged in the pin unit and sealed from the interior of the roll tubes. The pin unit may project into the roll tube and overlap the peripheral bore holes.

The invention further includes a method for cooling a roll jacket of a roll for use in a machine for producing a fibrous material web. The roll jacket may be heated by an exterior heat source and may include a hollow space that is at least partially filled with a vaporizable fluid. The roll, moreover, may be coupled with a heat exchanger. The method includes vaporizing the vaporizable fluid in the hollow space, condensing the vapor on the heat exchanger by a coolant flow through the heat exchanger, and rotating the heat exchanger within the hollow space to fling the condensed liquid within the hollow space.

In accordance with one aspect of the invention, it is possible for the method to also include reducing the pressure inside the hollow space below the pressure outside the roll. Further, the method may also include flushing a coolant through the heat exchanger to remove the heat from the roll. Further, the method may include directing the flung condensed liquid into a plurality of bores that communicate with the hollow space. The plurality of bores axially extend through the roll jacket.

The invention also includes a method for maintaining a uniform temperature of a roll for use in a machine for producing a fibrous material web. In this case, the roll may be heated on the exterior of the roll and may include a hollow space that is partially filled with a vaporizable fluid. Further, the roll may be coupled with a heat exchanger. The method includes vaporizing the vaporizable fluid in the hollow space, condensing the vapor on the heat exchanger, and rotating the heat exchanger within the hollow space to fling the condensed liquid within the hollow space.

In accordance with another aspect of the invention, the method may include reducing the pressure in the hollow space below the pressure on the exterior of the roll.

It is also possible for the method to include flushing the heat exchanger with coolant. Further, the method may include directing the flung condensed liquid into a plurality of bores communicating with the hollow space, wherein the plurality of bores axially extend through the roll jacket.

It is, of course, understood that the features discussed above and below may be used, not only in the combinations given, but also in other combinations or alone, without departing from the scope of the invention.

Other useful embodiments and advantages of the present invention may be ascertained by reviewing the present disclosure and the accompanying drawing.

BRIEF DESCRIPTION OF THE DRAWING

The present invention may be further described in the detailed description which follows, in reference to the noted drawing by way of non-limiting examples of a preferred embodiment of the present invention, and wherein:

The FIGURE is a schematic cross-sectional view of a roll arrangement.

DETAILED DESCRIPTION OF THE PRESENT INVENTION

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing FIGURE making apparent to those skilled in the art how the invention may be embodied in practice.

A roll arrangement 1 exhibits a roll 2 and a heating device 3, which heats the exterior of the roll 2. The heating device 3 acts on the circumferential surface 4 of the roll 2. The heating device 3 can, for example, utilize inductive heating, such that the roll 2 is an inductively heated roll. Of course, other types of heating are also possible.

The roll 2 includes a roll tube or roll jacket or roll sleeve 5. Several peripheral bore holes 6 are distributed in the roll tube or jacket or roll sleeve 5. The bore holes 6 are positioned parallel to the axis of the roll 2 in a circumferential direction (i.e., radially outward or toward the circumferential surface 4). Two of the bore holes 6 are visible in the FIGURE. The bore holes 6 connect to the radial inner wall near the axial end of the roll tube or jacket 5 via radially running supply canals 7.

The FIGURE depicts only one axial end of a roll structure 1. The other axial end is substantially the same, although certain deviations are discussed below.

The roll tube 5 surrounds an inner space 9. As the FIGURE shows, a pivot unit or pin unit 10 has been installed in the inner space 9. The pivot or pin unit 10 includes a pin 11, which is rotationally positioned around a bearing 12. The pin unit 10 also includes a circulating flange 13. The circulating flange 13 is positioned axially-inward, i.e., closer to the axial front of the roll tube 5. The pin unit 10 includes an extending cylindrical projection 14 that extends so far into the inner space 9 of the roll tube 5, that the radial bore holes 15 overlap the supply canals 7. A covering 16 is attached to the cylindrical projection 14. The covering 16 closes off the pin unit 10 from the inner space 9. The connection between the pin unit 10 and the roll tube 5 is gas-impermeable.

The pin unit 10 surrounds a hollow space 8. A heat exchanger 17 is arranged in the hollow space 8. In the example shown in the FIGURE, the heat exchanger 17 includes a helical arched tube. It should be noted, however, that other forms are possible. It is advantageous to have the heat exchanger 17 exhibit as much surface area in the hollow space 8 as possible.

In the FIGURE, the heat exchanger 17 includes an access path 18 and a diversion path 19, wherein coolant (denoted by arrow 20) flows. The access and the diversion paths 18, 19 are connected by a rotary transmissional lead through 21, which includes a supply structure for the coolant (not illustrated here).

At the other axial end of the roll 2 (not shown), another hollow space 8 may be provided. While it is not essential to the invention, another heat exchanger 17 may be arranged in the second hollow space 8.

The hollow space 8 and the peripheral bore holes 6 form a hollow structure with the connecting supply canals 7 and the bore holes 15. The bore holes 6 connect with each other via the hollow space 8, at both axial ends of the roll 2. It is possible, however, to replace the hollow space 8 and the radial bores 15 on one end of the roll 2 with a ring channel (not shown). A ring channel, which connects to the supply canals or radial channels 7, may be formed by a ring groove at the outer periphery of the pin unit 10 and connect to the radial channels 7.

A vaporizable fluid 24 (such as, for example, water) may be found in the hollow space arrangement 8, including the peripheral bore holes 6). The hollow space arrangement 6, 8 is impenetrable to liquid and gas. Thus, the fluid 24 is in a sealed system, even if the fluid 24 is partially vaporized by the addition of heat. In the FIGURE, the fluid 24, due to the centrifugal force created by the rotation of the roll 2, is shown resting radially outward against the walls of the bore holes 6.

The amount of fluid 24 that should be introduced into the system (i.e., into the hollow space arrangement 6,8), should be such that some of the fluid is present in its liquid state at all times and the hollow space arrangement 6,8 is not completely filled, i.e., there remains some free volume in the hollow space arrangement 6,8.

Further, the hollow space arrangement may include an evacuation extension 22, which is sealed by a closure 23. The evacuation extension 22 allows the pressure in the hollow space arrangement 6,8 to be lower than atmospheric pressure, or the pressure outside the hollow space arrangement 6,8.

During operation, the roll 2 rotates and, thus the heat exchanger 17 also rotates. Centrifugal forces cause the liquid 24 to be flung outward. The fluid 24 rests against the radial extension sides of the peripheral bore holes 6. Simultaneously, the roll 2 is heated by the heating device 3. Due to the heating, the fluid vaporizes, thereby increasing the pressure in the hollow space arrangement 6, 8. With the increase in pressure, the temperature of ebullition increases, resulting in a balance (i.e., equilibrium) between the liquid phase and the gas phase of the fluid. Even if the heating device does not heat substantially evenly, which is often the case with inductive heating devices, a relatively uniform temperature profile ensues due to the vaporizable fluid in the peripheral bore holes and because the rolls are generally fitted with several hollow shoes lying next to each other in an axial direction. In the warmer places—that is, in the spots where the heating device 3 heats more intensely, the fluid vaporizes and extracts heat from this place. Further, the fluid condensates at the cooler places and replaces the heat there. This effect is generally known at the "heat-pipe-effect."

If the roll must be cooled because, for example, it must be exchanged, the heating structure 3 is first turned off so that no further heat is supplied. Then, the heat exchanger 17 is flushed with a coolant, for example cooling water. Preferably, temperature of the coolant is lower than the temperature of the condensation of the vaporizable fluid located in the hollow space 6,8. Thus, the vaporizable fluid 24 will condense on the heat exchanger 17. If possible, the vaporizable fluid 24 is then cooled to a temperature that is below the condensation temperature. If the heat exchanger 17 rotates with the roll tube 5, the fluid that condenses on the heat exchanger 17 will be immediately flung outwards, and then flow, due to the effect of centrifugal forces, into the peripheral bore holes 6 to absorb additional heat at the wall of the roll tube 5.

The effect of the above is a uniform, very even temperature distribution in the roll tube 5 during the entire cooling process. Thus, the thermal stresses attributed to unequal temperatures at various places can be largely avoided.

The pressure in the hollow space 8 is withheld from the inner space 9 by way of the covering 16. Moreover, because the size of the hollow space 8 can be relatively limited, larger pressures cannot build inside the roll tube 5 (for which arrangements would have to be made). Rather, the pressures in the roll tube 5 are limited to the peripheral bore holes 6.

It is noted that the foregoing examples have been provided merely for the purposes of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and the spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A roll arrangement for use in a machine for producing a fibrous material web comprising:

a roll having an axis and two axial ends, the roll including a hollow space arrangement on an interior of the roll;

a heating device that acts on an exterior of the roll;

a heat exchanger positioned in the hollow space arrangement;

a vaporizable fluid positioned in the hollow space arrangement, the vaporizable fluid having a liquid phase and a gas phase; and axial bores coupled to the hollow space arrangement and positioned to receive the liquid phase of the vaporizable fluid from the heat exchanger.

2. The machine according to claim 1, the fibrous material web being a paper web.

3. The machine according to claim 1, the fibrous material web being a cardboard web.

4. The roll arrangement according to claim 1, the liquid phase and the gas phase of the fluid being present during substantially all operational stages of the roll.

5. The roll arrangement according to claim 1, the hollow space arrangement including an evacuation extension for reducing a pressure on the interior of the roll.

6. The roll arrangement according to claim 1, the heat exchanger having a temperature below a condensation temperature of the fluid.

7. The roll arrangement according to claim 1, the heat exchanger being rotatable.

8. The roll arrangement according to claim 7, the heat exchanger being adapted to receive coolant from a rotating extension positioned on the exterior of the roll.

9. The roll arrangement according to claim 1, the hollow space arrangement including a hollow space that substantially fills the interior of the roll.

10. The roll arrangement according to claim 1, the hollow space arrangement including a multitude of peripheral bore holes, the peripheral bore holes being circumferentially distributed and extending substantially parallel to the axis of the roll.

11. The roll according to claim 10, the heat exchanger being positioned within the hollow space and the peripheral bore holes being connected to the hollow space.

12. The roll arrangement according to claim 11, the hollow space extending within the roll in an axial direction.

13. The roll arrangement according to claim 1, the roll including a pin unit, the pin unit including a pin rotationally positioning the roll, and the heat exchanger being positioned in the pin unit.

14. The roll arrangement according to claim 13, the roll including a roll tube on the interior of the roll, the pivot unit projecting into the roll tube and overlapping the peripheral bore holes, the hollow space being positioned in the pin unit, and the hollow space being sealed in the axial direction from the interior of the roll tube.

15. A roll arrangement for use in a machine for producing a fibrous material web comprising:

a roll having an axis and two axial faces, the roll further including a hollow space positioned inside the roll, the hollow space being substantially impermeable to gas and liquid;

a heating device heating a circumferential surface of the roll;

a heat exchanger arranged in the hollow space;

a vaporizable fluid positioned in the hollow space; and axial bores coupled to the hollow space arrangement and positioned to receive the liquid phase of the vaporizable fluid from the heat exchanger.

16. The roll arrangement according to claim 15, the fibrous material web being a paper web.

17. The roll arrangement according to claim 15, the fibrous material web being a cardboard web.

18. The roll arrangement according to claim 15, the vaporizable fluid existing in a liquid phase and a gas phase in the hollow space during substantially all operational stages of the roll.

19. The roll arrangement according to claim 15, the roll further including an evacuation extension positioned in the hollow space and extending outside the roll, the evacuation extension adapted to lower the pressure inside the hollow space.

20. The roll arrangement according to claim 15, the heat exchanger having a temperature lower than a condensation temperature of the vaporizable fluid.

21. The roll arrangement according to claim 15, the heat exchanger being adapted to rotate inside the hollow space.

22. The roll arrangement according to claim 21, the heat exchanger being coupled with a coolant supply.

23. The roll arrangement according to claim 22, the hollow space substantially filling an interior of the roll.

24. The roll arrangement according to claim 15, the hollow space including a multitude of peripheral bore holes, the peripheral bore holes being circumferentially distributed and extending substantially parallel to the axis.

25. The roll according to claim 24, the heat exchanger and the peripheral bore holes being connected to the hollow space.

26. The roll arrangement according to claim 25, the hollow space extending somewhat towards the two axial faces.

27. The roll arrangement according to claim 15, the roll including a pin unit, the pin unit including a pin rotationally positioning the roll, and the heat exchanger sited in the pin unit.

28. The roll arrangement according to claim 27, the roll including a roll jacket having an interior, the hollow space arranged in the pin unit and sealed from the interior of the roll tube, and the pin unit projecting into the roll tube and overlapping the peripheral bore holes.

29. A method for cooling a roll jacket of a roll for use in a machine for producing a fibrous material web, the roll jacket being heated by an exterior heat source, the roll including a hollow space at least partially filled with a vaporizable fluid, the roll being coupled with a heat exchanger, and axial bores being coupled to the hollow space, the method comprising:

vaporizing the vaporizable fluid in the hollow space;

condensing the vapor on the heat exchanger by a coolant flow through the heat exchanger;

rotating the heat exchanger within the hollow space to centrifugally disperse the condensed liquid within the hollow space; and receiving the condensed liquid from the heat exchanger in the axial bores.

30. The method according to claim 29, further comprising reducing the pressure inside the hollow space below the pressure outside the roll.

31. The method according to claim 29, further comprising flushing a coolant through the heat exchanger thereby removing the heat from the roll.

32. The method according to claim 29, further comprising directing the flung condensed liquid into a plurality of bores communicating with the hollow space, wherein the plurality of bores axially extend through the roll jacket.

33. A method for maintaining a uniform temperature of a roll for use in a machine for producing a fibrous material web, the roll being heated on the exterior of the roll via an external heating device, the roll including a hollow space partially filled with a vaporizable fluid, the roll being coupled with a heat exchanger, and axial bores being coupled to the hollow space, the method comprising:

vaporizing the vaporizable fluid in the hollow space;

condensing the vapor on the heat exchanger;

rotating the heat exchanger within the hollow space to centrifugally disperse the condensed liquid within the hollow space; and receiving, in the axial bores, the condensed liquid from the heat exchanger.

34. The method according to claim 33, further comprising reducing the pressure in the hollow space below the pressure on the exterior of the roll.

35. The method according to claim 33, further comprising flushing a coolant through the heat exchanger.

36. The method according to claim 33, further comprising directing the flung condensed liquid into a plurality of bores communicating with the hollow space, wherein the plurality of bores axially extend through the roll jacket.

37. A roll arrangement for use in a machine for producing a fibrous material web comprising:
- a roll having an axis and two axial ends, the roll including a hollow space arrangement on an interior of the roll;
- a heating device that acts on an exterior of the roll;
- a heat exchanger positioned in the hollow space arrangement;
- a vaporizable fluid positioned in the hollow space arrangement, the vaporizable fluid having a liquid phase and a gas phase; and
- a switch for selectively switching off the heat exchanger while the heating device acts on the roll exterior.

38. A roll arrangement for use in a machine for producing a fibrous material web comprising:
- a roll having an axis and two axial faces,
- the roll further including a hollow space positioned inside the roll, the hollow space being substantially impermeable to gas and liquid;
- a heating device heating a circumferential surface of the roll;
- a heat exchanger arranged in the hollow space;
- a vaporizable fluid positioned in the hollow space; and
- a switch for selectively deactivating the heat exchanger while the heating device is heating the circumferential surface of the roll.

39. The method according to claim 29, wherein, before vaporizing the vaporizable fluid in the hollow space, the method further comprises:
- deactivating the exterior heat source; and
- activating the heat exchanger after the exterior heat source has been deactivated.

40. The method according to claim 29, wherein, before deactivating the exterior heat source, the method further comprises:
- heating and pressing the material web with the roll.

41. The method according to claim 33, wherein, before vaporizing the vaporizable fluid in the hollow space, the method further comprises:
- deactivating the external heating device; and
- activating the heat exchanger after the external heating device has been deactivated.

42. The method according to claim 41, wherein, before deactivating the external heating device, the method further comprises:
- heating and pressing the material web with the roll.

* * * * *